Jan. 14, 1936.  P. MOREAU  2,027,924

FREEWHEEL DEVICE

Filed April 12, 1933   3 Sheets-Sheet 1

Inventor:
Pierre Moreau
per Fred F. Barlow
Attorney

Jan. 14, 1936.   P. MOREAU   2,027,924
FREEWHEEL DEVICE
Filed April 12, 1933   3 Sheets-Sheet 2

Inventor:
Pierre Moreau
per Fred F. Baelow
Attorney

Jan. 14, 1936.   P. MOREAU   2,027,924
FREEWHEEL DEVICE
Filed April 12, 1933   3 Sheets-Sheet 3

Patented Jan. 14, 1936

2,027,924

UNITED STATES PATENT OFFICE 2,027,924

FREEWHEEL DEVICE

Pierre Moreau, Neuilly, France

Application April 12, 1933, Serial No. 665,768
In France April 18, 1932

9 Claims. (Cl. 192—46)

This invention relates to free-wheel devices for automobile vehicles or for similar industrial purposes, which have the advantages relatively to the known arrangements at present in use, of avoiding the necessity of driving by means of rollers, balls, pawls or other members which subject the parts to compression stresses which are difficult to resist satisfactorily.

The principal characteristic of the invention resides in the fact that the mechanism embodies a movable nut adapted to co-operate with a bayonet slot structure permitting it to be displaced axially in such a way that when the engine shaft turns more rapidly than the output shaft, the nut is in driving engagement through the said bayonet slots and the shafts connected to one another, while when the output shaft turns more rapidly than the engine shaft, the nut is caused automatically to disengage from the engine shaft so that such shaft is no longer connected to the output shaft.

The axial displacement of this drive nut is thus controlled automatically by the engine shaft in normal operation and by the output shaft in the free-wheel position.

It is understood that the free-wheel mechanism based on the above characteristic may be constructed in various ways according to the industrial application to which it is to be applied. The members thereof, and particularly the movable nut, can be modified as regards form and dimensions without changing the novel principles on which the present invention is based.

The attached drawings represent by way of example certain embodiments of the invention which are applicable more particularly to automobiles.

Figure 1:
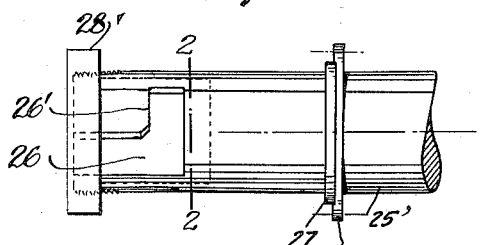
Fig. 1 shows in elevation the inner part of a free-wheel clutch according to one embodiment.
Figure 2:
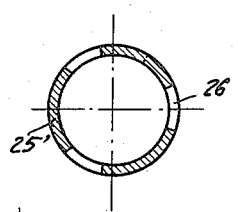
Fig. 2 is a section on 2—2 of Fig. 1.
Figure 3:
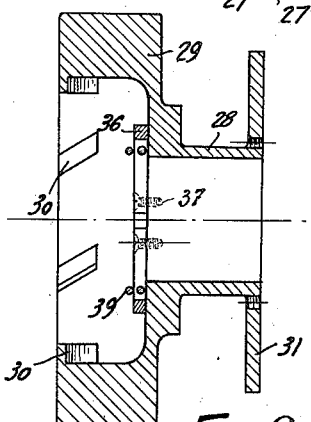
Fig. 3 is a cross section of the outer part of this embodiment of the free-wheel clutch.
Figure 4:
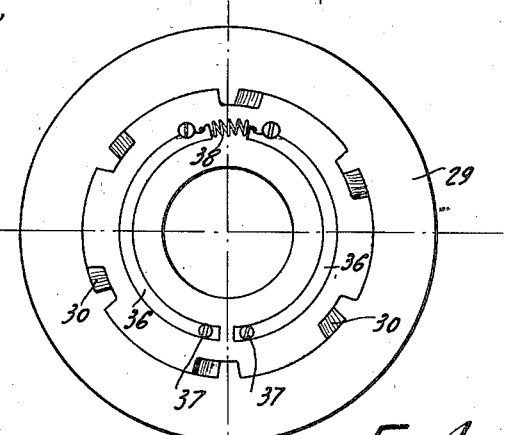
Fig. 4 is an end view of Fig. 3.
Figure 5:
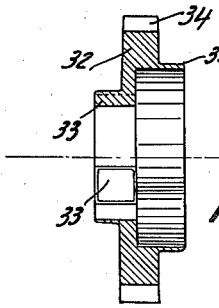
Fig. 5 is a cross section of an intermediate member serving to connect the aforesaid inner and outer parts.
Figure 6:
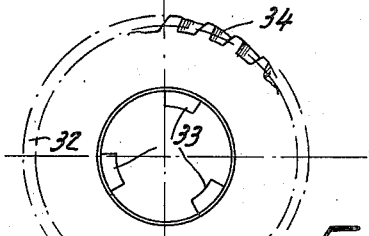
Fig. 6 is an end view of Fig. 5.

In the form of the invention shown in Figs. 1 to 6 and 10 an axle $25'$ (Fig. 1) constitutes the engine shaft and in the hollow extremity of this axle there are provided three recesses or grooves 26 in the form of bayonet slots. This axle is introduced within the hub 28 of a pinion 29 (Fig. 3) having interiorly six teeth 30 cut in helical form. As shown, the collar 27 of the axle $25'$ (Fig. 1) rests against the face 31 of the pinion 29, a ring $27'$ fixed to axle $25'$ by means of small screws maintaining it in this position. The extremity of the axle is provided with a screwed cap $28'$ closing the slots 26.

On this axle $25'$ is then slid the nut 32 embodying three rectilinear keys 33 (Figs. 5 and 6) which slide in bayonet slots 26 of the shaft $25'$. This nut has cut therein a series of helicoidal grooves 34, which are adapted to co-operate with the teeth 30 of the pinion 29. The hub 35 of this nut is adapted to engage between semicircular jaws 36 pivoted around screws 37 and influenced by a spring 38. Finally, a small spring 39 (Fig. 3) has for its object to maintain the movable nut 32 always pressed against the shoulders $26'$ (Fig. 1) of the bayonet slots 26 and to facilitate the coupling of the movable nut 32 with the teeth 30 of the pinion 29. When the nut 32 moves to the extreme right the grooves 34 disengage from the teeth 30 and the mechanism is in the free wheel position.

If it is supposed that the movable nut 32 is in the free-wheel position, with the axle $25'$ turning more slowly than the pinion 29, the three keys 33 are placed at the ends of the bayonet grooves 26 and rest on surfaces $26'$, the small spring 39 serving to maintain these keys 33 against the shoulders $26'$. If now the rotation of the axle $25'$ is accelerated, the nut 32 being lightly braked on the circumference of its hub 35 by the jaws 36, turns slightly in such a way as to present the three keys 33 in front of the three longitudinal portions of the grooves 26. The spring 39 extending, produces the coupling of the nut 32 which slides towards the left and engages the teeth 30 of the pinion 29. This pinion 29 is formed in one with or is attached to the driven shaft. If now the engine shaft $25^1$ turns more slowly than the pinion 29, the nut 32 is moved towards the free wheel position and is then submitted to the action of jaws 35 which cause keys 33 to move into the ends of the bayonet slots 26.

Figure 7:
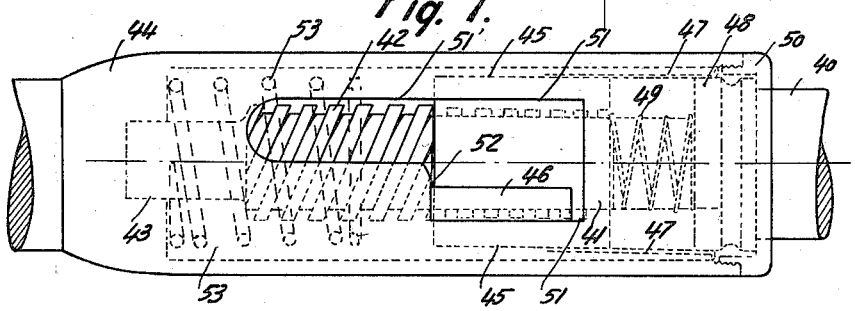
Fig. 7 is a view of the mechanism according to another embodiment of the invention.
Figure 11:
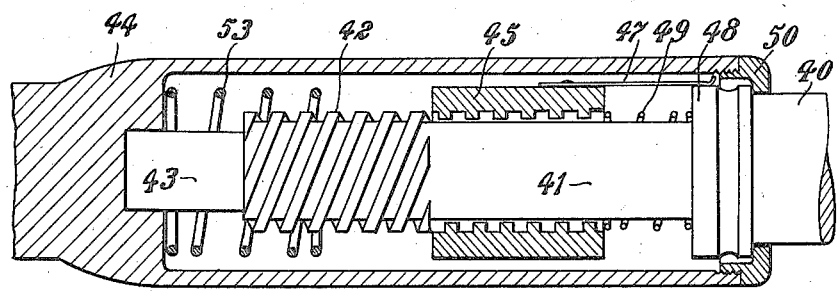
Fig. 11 is a sectional view of the embodiment of Fig. 7.

In the arrangement shown in Figs. 7 and 11 the engine shaft 40 is terminated by a spindle 41 on which is cut a thread with a rapid pitch 42, the extremity 43 of this spindle rotating in an aperture in the output shaft 44. Upon this spindle and in front of the thread 42, a nut 45 is adapted to turn loosely, said nut being provided on its periphery with two opposed keys 46. This nut carries further braking blades 47 riveted to its circumference and of which the extremities press against the collar 48 of the engine shaft 40. A small spring 49, called the feed spring, always tends to displace the nut 45 towards the left. A cap 50 screwing in the end of the output shaft 44 maintains the engine shaft 40 in position.

In the hollow part of the output shaft 44 there are cut two bayonet slots 51 placed diametrically opposite one another. It will be noted that the surface 52 of these slots is slightly inclined in such a way as to facilitate the engagement, that is to say the coupling of the nut 45 with the threaded part 42.

In the position shown, the axle 40 which is the engine shaft, turns more slowly than the shaft 44. In this position, the nut 45 turns loosely in front of the threaded part 42 of the spindle 41, the spring 49 maintaining it pressed against the surfaces 52 of the slots 51. As soon as the shaft 40 is caused to turn more rapidly than 44, the nut 45 is driven, its two keys 46 sliding along the surfaces 52 and when the keys come opposite the portions 51' of the grooves 51, the spring 49 becomes active, producing the feed of the two threads into contact with one another. The nut 45 is then displaced without turning along the portion of the groove 51, being driven by the thread 42, which can screw therein. During this linear movement, the nut 45 encounters the return spring 53 which is thus tensioned. It thus follows that 40 and 44 are coupled and rotate at the same speed of rotation.

If now the speed of the shaft 40 drops, the shaft 44 turns more rapidly, the nut 45 tends to unscrew, that is to say to return to its initial position. This movement is facilitated by the tension of the spring 53. The nut thus unscrews and arriving at the end of this movement, it is returned to its original position ready to screw again onto the thread 42 as soon as the relative speed of the two shafts 40 and 44 changes.

Figure 8:
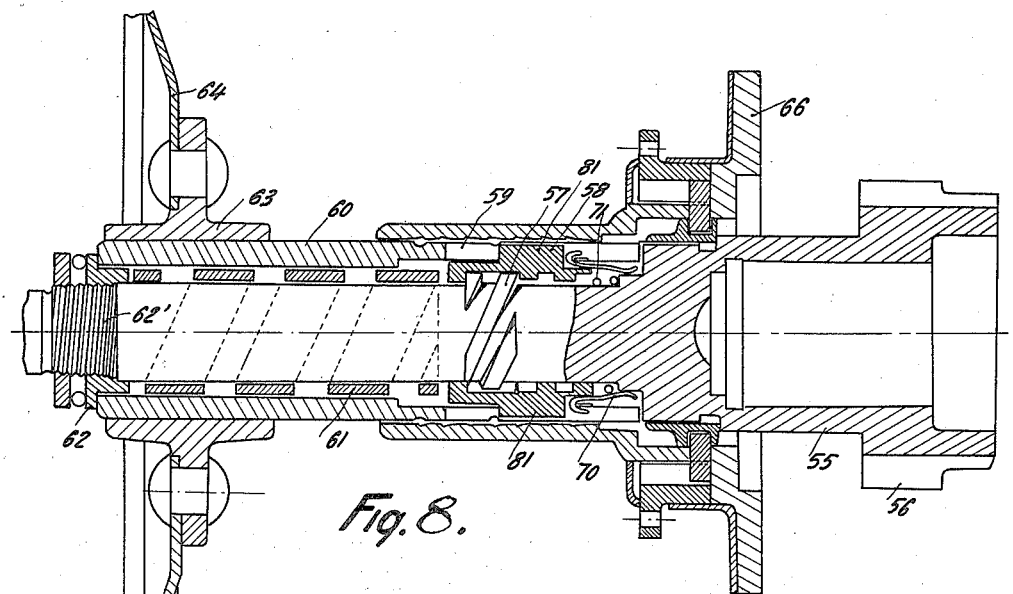
Fig. 8 is an axial section of a free-wheel mechanism according to Fig. 7 but the said mechanism is located about an extension of the pinion at one end of the change speed box.
Figure 9:
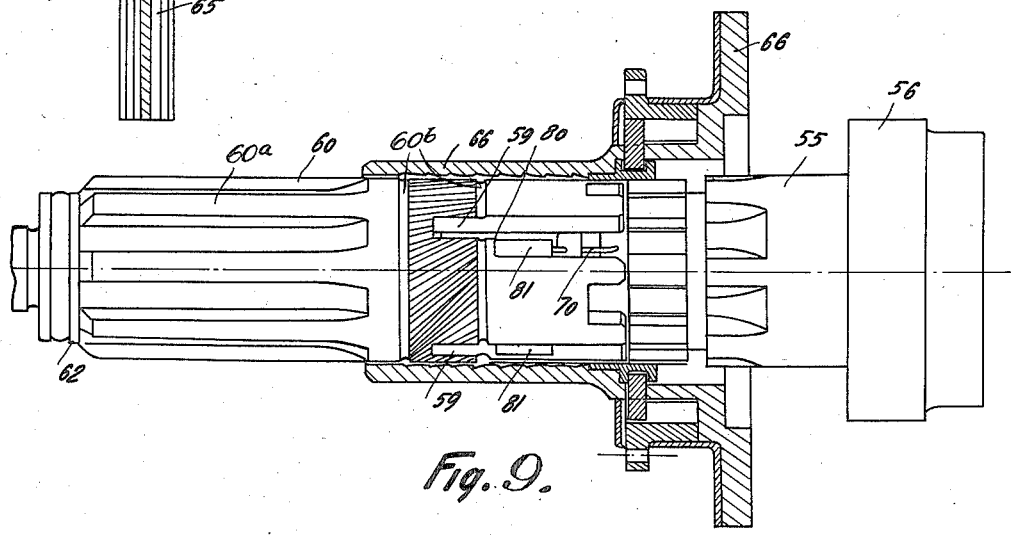
Fig. 9 is an exterior view of the drive tube partly in section.
Figure 10:
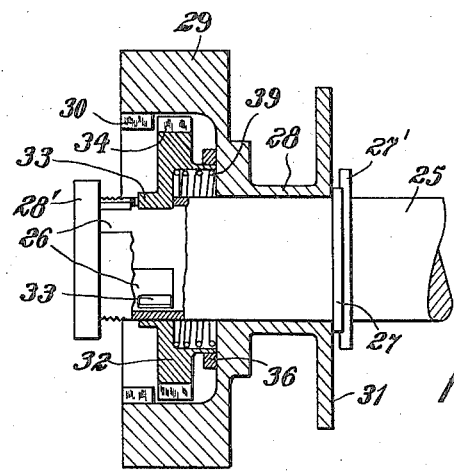
Fig. 10 is an assembled view of the embodiment of Figs. 1-6 in the free wheeling position.

Other arrangements may also be provided for employing the principle described without modifying the characteristics, as shown for example in Figs. 8 and 9 in which the mechanism is located between the extension 55 of the input pinion 56 of the change speed box and the drive tube 60. The extension 55 of this pinion carries a threaded portion 57 on which there can screw the movable nut 58 guided in its axial movement by the slots or grooves 59 cut in the driving tube 60. Between this driving tube 60 and the extension 55 there is disposed an abutment spring 61 abutting at one end on the abutment nut 62 screwing on the threaded portion 62'. The driving tube 60 is provided with a number of grooves 60ª and the hub of the clutch disc 63 is mounted on said tube. To the said hub, the clutch discs 65 are fixed by means of the flange 64. The whole of the assembly is located in relation to the casing on the speed box by means of a cap 66. Oil retaining and collecting grooves 60ᵇ are provided around tube 60, as shown.

The parts are shown in operation at the free-wheel position, that is to say the shaft 55 leading to the speed box turns more rapidly than the engine shaft, this shaft 55 turning freely in the internally threaded movable nut 58 and the driving tube 60 not being actuated.

If the engine is accelerated, at the precise moment when the driving tube 60 turns more rapidly than the shaft 55 the nut 58, braked by the friction devices 70 constituted by small blades forming springs, is displaced along a ramp 80 so that the projecting portions 81 thereof are presented in front of the slots 59 of the drive tube 60. The threaded nut submitted to the action of the small spring 71 then screws a fraction of a turn on the threaded portion 57 of the extension 55 so as to abut against the end of the slots of the drive tube while compressing the spring 61 which damps any shock due to the coupling. If the engine is allowed to slow down without the vehicle being braked, the inverse movement is produced and the nut 58 returns automatically to the position in which the mechanism is in the free-wheel condition. In effect, the shaft 55 rotating more rapidly than the driving tube, the movable nut first of all unscrews by being displaced with an axial movement. At the moment when the nut 58 leaves the thread 57, the friction devices 70 come into play and by reason of the friction which they exercise on the collar of the shaft 55, the movable nut 58 is driven by means of the keys or projecting portions 81 thereof along the ramps 80. This movement has for its effect to separate the nut 58 from the thread 57 by the necessary distance, the spring 71 then being without effect since the nut is pressed against the flat surface at the ends of the ramps 80.

The great advantage of this mechanism resides in the fact that it constitutes a self-acting disengagement device which avoids all wear of the clutch members and permits changes of speed without unclutching. It is well understood that the helicoidal teeth may be replaced by any arrangement of threads or keys of helicoidal form.

What I claim and desire to secure by Letters Patent of the United States of America is:—

1. Free-wheel clutch mechanism for connecting driving and driven shafts comprising two co-operating threaded members through which the drive is effected, one of which can be moved axially relatively to the other, a housing to guide said movable member, said housing embodying a bayonet slot, a projection on said movable member to co-operate with said bayonet slot, and means for engaging and disengaging said threaded members dependent on the relative speeds of the driving and driven shafts.

2. Free-wheel clutch mechanism for connecting driving and driven shafts comprising a threaded member secured to one of said shafts, a co-operating threaded member adapted for restricted axial movement relatively to the other of said shafts, a projection on said movable threaded member co-operating with a bayonet slot in the said other shaft, and frictional means associated with said movable threaded member whereby the speed difference between the shafts causes engagement and disengagement of the threaded members.

3. Free-wheel clutch mechanism for connecting driving and driven shafts comprising a screwed spindle on one shaft, a hollow housing enclosing said spindle on the other shaft, said hollow housing embodying a plurality of bayonet slots, an axially movable nut adapted to co-operate with said screwed spindle, projections on said nut engaging in said slots, and frictional means on said nut engaging a part of the screwed spindle and serving to bring the said nut into engagement with the said spindle under the control of the speed difference between the driving and driven shafts.

4. Free-wheel clutch mechanism as claimed in claim 3 wherein the said frictional means comprise blade springs secured to the nut and pressing resiliently against a part of the shaft carrying the screwed spindle.

5. Free-wheel clutch mechanism for connecting driving and driven shafts comprising a hollowed pinion connected to one shaft, a movable nut co-operating with the inside of said pinion, co-operating helicoidal teeth on the inner periphery of the said pinion and on said nut, projections on said nut serving to engage bayonet slots in the other shaft, and frictional means arranged in the inner periphery of said pinion and serving to engage said nut to produce engagement of the nut and said pinion when the speeds of the driving and driven shafts are equalized.

6. Free-wheel clutch mechanism as claimed in claim 5 wherein said other shaft is provided with an end cap to restrict the axial movement of the nut.

7. Free-wheel clutch mechanism as claimed in claim 5 wherein the frictional means comprise semicircular segments adapted to engage a hub on the nut.

8. Free-wheel clutch mechanism as claimed in claim 5 wherein a spring is provided, tending to produce engagement of the threads on the pinion and on the nut, said spring serving to press the projections on the nut against the sides of the bayonet slots.

9. Free-wheel clutch mechanism for automobiles having a change speed box of which one of the pinions is provided with an extension, said mechanism having input and output shafts, comprising a helicoidal thread on said extension, a threaded nut co-operating with said thread, a housing for guiding said nut, said housing embodying a bayonet slot, a projection on said nut co-operating with said bayonet slot, and frictional means whereby when the input shaft rotates at a slower speed than the pinion, the nut becomes disengaged from the said helicoidal thread.

PIERRE MOREAU.